United States Patent [19]

Suda et al.

[11] Patent Number: 5,360,775

[45] Date of Patent: Nov. 1, 1994

[54] POROUS CLAY INTERCALATION COMPOUND AND ITS PRODUCTION METHOD

[75] Inventors: Mitsuru Suda; Kunio Ohtsuka, both of Saitama, Japan

[73] Assignee: Mitsubishi Material Corporation, Tokyo, Japan

[21] Appl. No.: 986,428

[22] Filed: Dec. 4, 1992

[30] Foreign Application Priority Data

Dec. 18, 1991 [JP] Japan .................................. 3-353688

[51] Int. Cl.$^5$ .............................................. B01J 21/16
[52] U.S. Cl. .......................................... 502/84; 502/86
[58] Field of Search .................................. 502/84, 86

[56] References Cited

U.S. PATENT DOCUMENTS 4,742,033  5/1988  Harris et al. ........................... 502/84
5,059,568  10/1991  McCauley ............................... 502/84

*Primary Examiner*—Carl F. Dees

*Attorney, Agent, or Firm*—McAulay Fisher Nissen Goldberg & Kiel

[57] ABSTRACT

A laminar clay having ion-exchange property is mixed with a solution containing polynuclear metal hydroxo cations or positively charged hydroxide or oxide fine particles to serve as precursor ions (3) of inorganic pillars so as to exchange a part of cations (2) between clay layers (1) with the precursor ions (3) of the inorganic pillars. Next, the laminar clay thus obtained is heat-treated at 100° to 900° C. to generate a porous clay intercalation compound, this porous clay intercalation compound is mixed with an ammonium salt aqueous solution to ion-exchange remaining cations (2) with ammonium ions (5). This porous clay intercalation compound is heat treated again at 200° to 900° C. to desorb ammonia, so as to allow hydrogen ions (6) to be carried in the pore portions of the porous clay intercalation compound and on its surface portions. The porous clay intercalation compound thus obtained has both a shape selectivity function owing to its uniform pore structure and high catalytic activity owing to the hydrogen ions (6).

18 Claims, 1 Drawing Sheet

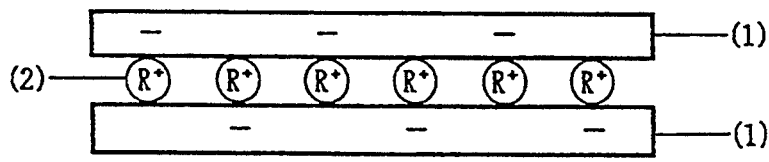
FIG. 1A
↓ ION-EXCHANGE
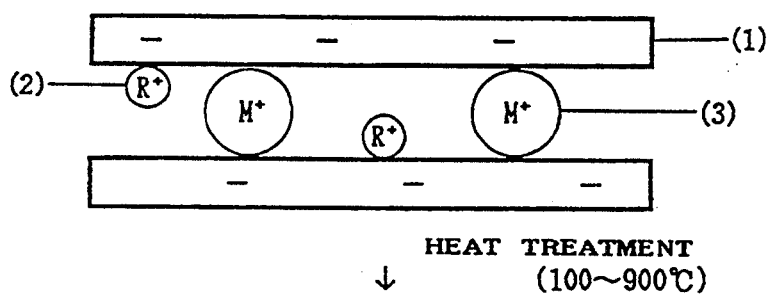
FIG. 1B
↓ HEAT TREATMENT (100~900°C)
FIG. 1C
↓ AMMONIUM SALT TREATMENT
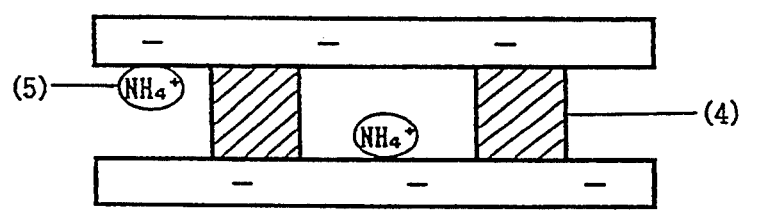
FIG. 1D
↓ RE-HEAT TREATMENT (200~900°C)
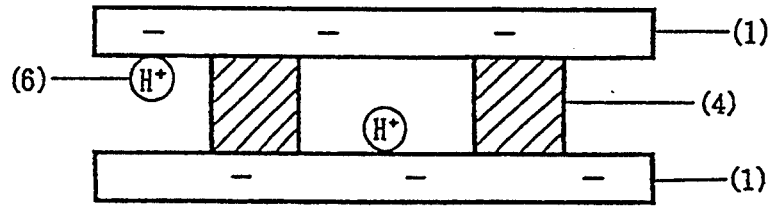
FIG. 1E

POROUS CLAY INTERCALATION COMPOUND AND ITS PRODUCTION METHOD

BACKGROUND OF THE INVENTION

The present invention relates to a porous clay intercalation compound which is suitable for use in catalysts, absorption separating agents, deodorizers and the like and to a method for its production. In particular, it relates to a porous clay intercalation compound in which hydrogen ions are carried in the pore portions and on the surface portion so as to enhance the solid acidity, and exhibiting a shape selectivity function.

Conventionally, as inorganic porous compounds containing uniform micropores, zeolites and a porous clay intercalation compound are known. The porous clay intercalation compound has slit-shaped pores therein. The layers of a laminar clay mineral, such as, montmorillonite and the like, are cross-linked with inorganic oxide fine particles, such as, $Al_2O_3$, $ZrO_2$ and the like. The inorganic oxide fine particle is called the pillar because it supports the space between the clay layers. The pore diameter of the porous clay intercalation compound can be represented by the distance between layers and the distance between pillars, and it is controlled by the types and sizes of the clay and the pillar to be used, which can be several angstroms to several tens of angstroms. For example, when pillars having a large size are inserted, the distance between layers is widened, while when a clay having a small negative layer charge or a polynuclear cation of high valence is used, the distance between pillars is widened. The pore diameter of the porous clay intercalation compound is uniform, being about a molecular diameter, so that it has a shape selecting function and can be used as a molecular sieve similar to zeolite.

In addition, the porous clay intercalation compound is generally a solid acid and exhibits catalytic activity, making it suitable for use as a shape-selective catalyst. For example, its effectiveness as a cracking catalyst in the petroleum chemistry is described in a plurality of references (E. Kikuchi, T. Matsuda; Catal. Today, 2,297 (1988), M. L. Occeli, R. J. Rennard; Catal. Today, 2, 309 (1988), H. Ming-Yuan, L. Zhonghui, M. Enze; Catal. Today, 2, 321 (1988), M. L. Occeli; Catal. Today, 2, 339 (1988)).

The solid acidity of the prior art porous clay intercalation compound is also determined by the type of clay and the inorganic pillar. For example, in conventional clay, the acidity is relatively strong in montmorillonite; however, it is weak in sodium fluoride tetrasilicic mica which is a species of artificial mica. In addition, in conventional pillars, $SiO_2$ or $TiO_2$ shows strong acidity; whereas $Cr_2O_3$ inversely shows alkalinity. Due to these facts, the combinations of clay and pillar which enhance solid acidity are limited, and it has been difficult to synthesize a porous clay intercalation compound having both the desired pore diameter and solid acidity.

On the other hand, as porous solid acid catalysts, H-type zeolite and silica alumina are known. However, the pore diameter of zeolite is not more than 10 angstroms, and the size of the molecule which can enter into the inside of the pore is limited to, at most, to molecules no larger than benzene compounds. Treatment of large molecules, such as, polycyclic aromatic compounds, is impossible. In addition, although the silica alumina has a large pore diameter, it is inferior in uniformity, and thus has no shape selectivity.

SUMMARY OF THE INVENTION

An object of the present invention is to provide a porous clay intercalation compound having increased sites of solid acid in the pore portions and/or at the surface portions, and which has a high catalytic activity, in addition to enhanced shape selectivity for large molecules, e.g., polycyclic aromatic compounds, and a method for its production.

This object has been achieved by the inventive porous clay intercalation compound having hydrogen ions in the pore portions and on the surface portions and in which inorganic pillars are inserted between layers of the laminar clay.

The porous clay intercalation compound of the present invention may be produced by mixing a laminar clay having an ion-exchange property with a solution containing polynuclear metal hydroxo cations or positively charged hydroxide or oxide fine particles. These serve as precursor ions of the inorganic pillars so as to ion-exchange a portion of the cations between the clay layers with the precursor ions of the inorganic pillars. The mixed laminar clay is heated at 100° to 900° C. to generate a porous clay intercalation compound. The porous clay intercalation compound is mixed with an aqueous solution of an ammonium salt in order to ion-exchange the remaining cations with ammonium ions. The porous clay intercalation compound is then heated at 200° to 900° C. to desorb ammonia, thus allowing the hydrogen ions to be carried in the pore and surface portions.

BRIEF DESCRIPTION OF THE DRAWING

FIGS. 1A, 1B, 1C, 1D and 1E are schematic drawings showing the steps for producing the inventive porous clay intercalation compound from a laminar clay according to the inventive process.

DETAILED DESCRIPTION OF THE PREFERRED EMBODIMENT

Starting Raw Material

A porous clay intercalation compound suitable for use as a starting raw material for the present invention is a laminar compound in which inorganic pillars, such as, $Al_2O_3$, $ZrO_2$, $Cr_2O_3$, $Bi_2O_3$, $SiO_2$, $TiO_2$, $Fe_2O_3$, and the like, are inserted between layers of a laminar clay. The laminar clay may be a phyllosilicate having an ion-exchange property, which includes montmorillonite, beidellite, hectorite, saponite, nontronite, vermiculite, and the like, as natural products, as well as artificial synthesized substances, such as, fluoro-mica having a swelling property or isomorphously substituted substances.

Referring to FIG. 1A, the silicate layers (1) of these clays have a negative charge of $-0.3$ to $-1.0$ per unit composition ($-O_{10}(OH)_2$ or $-O_{10}F_2$). Cations R+ (2) coordinate between the silicate layers so as to neutralize the negative charge. Generally the cations are alkali metal ions or alkaline earth metal ions, such as, Na+, Li+, $Ca^{2+}$, and the like. The cations R+ are easily exchanged with other cations.

Cations R+ between the clay layers are subjected to ion-exchange with other bulky polynuclear metal hydroxo cations or positively charged fine particles of hydroxide or oxide, such other cations and particles serving as a prescursor of the inorganic pillars. Heating and dehydration then carried out to produce a porous clay intercalation compound having a structure in which the spaces between the layers are cross-linked by fine particles of oxide. Polynuclear metal hydroxo cation suitable to be inserted, include for example $[Al_{13}O_4(OH)_{24}]^{7+}$, $[Zr_4(OH)_8]^{8+}$, $[Cr_n(OH)_m]^{(3n-m)+}$, $[Bi_6(OH)_{12}]^{6+}$ and $[Fe_3O(OCOCH_3)_6]^+$. Positively charged inorganic oxide fine particles include $SiO_2$ sol and $TiO_2$ sol, each having added $Ti^{4+}$ and $Fe^{3+}$.

In the present invention, the cations remaining during the ion-exchange are utilized in order to add hydrogen ions. Namely, the remaining cations are ion-exchanged with ammonium ions followed by heating to desorb the ammonia, thus leaving the hydrogen ions on the surface and in the pores. Therefore, the greater the amount of the cations remaining after the ion-exchange with the precursor ions of the inorganic pillars, the greater the amount of hydrogen ions added.

Ion-exchange Step

In the ion-exchange step, the laminar clay is mixed with a solution containing precursor ions of the inorganic pillars, namely a polynuclear metal hydroxo cation solution, or a sol of positively charged hydroxide or oxide fine particles. By means of the ion-exchange, as shown in FIGS. 1B, the precursor ions (3) of the inorganic pillars are inserted between the silicate layers. The ion-exchange ratio of the laminar clay varies depending on its layer charge. However, a 100% complete ion-exchange is not possible with a single ion-exchange procedure, and a residual amount of cations remain. Generally, the smaller the negative charge of the silicate layer, the higher the ion-exchange ratio becomes. For example, for a montmorillonite having a layer charge of $-0.33$ per unit composition ($-O_{10}(OH)_2$ or $-O_{10}F_2$), the ion-exchange ratio becomes not less than 90%. In contrast, for the sodium fluoride tetrasilicic mica having a layer charge of $-1.0$, the ratio is 70 to 80%. It is believed that the ion-exchange ratio differs as described above is that the restriction force for the cation differs depending on the layer charge. Namely, it is reasoned that for a clay having a small negative charge, the binding force for the cation is weak and the ion-exchange ratio becomes high. However, for a clay having a large negative charge, the binding force for the cation is strong and the ion-exchange ratio becomes low.

In this ion-exchange step, in order to lower the ion-exchange ratio, the ion-exchange time may be shortened, or the amount of precursor ions of the inorganic pillars mixed with the clay may be reduced. However, if the ion-exchange amount is too small, the intercalation by the pillars becomes too low, and, consequently, a porous compound having uniform pores cannot be formed. Therefore, it is desirable that the ion-exchange ratio is not less than 50%. After being ion-exchanged, the clay may be washed with water if necessary, and further dried at a temperature of not more than 100° C.

Heat Treatment Step

In the next heat treatment step, the dried clay material, after the above-mentioned ion-exchange step, is heated at 100° to 900° C. by means of an electric furnace or the like. The precursor ions between the layers are dehydrated by this heat treatment and become the inorganic pillars (4) shown in FIG. 1C. By doing so, the porous clay intercalation compound having a structure cross-linked by pillars (4) is obtained.

The most preferable heating temperature is 300° to 500° C., however, this depends on the types of clay and the pillars.

Ammonium Salt Treatment Step

In the next step, the porous clay intercalation compound after the above-mentioned heat treatment step, is mixed with an ammonium salt aqueous solution, and the remaining cations are exchanged with ammonium ions. As a result, as shown in FIG. 1D, the ammonium ions (5) are carried between layers of the porous clay intercalation compound.

Any ammonium salt may be used, provided that it is soluble in water and dissociates to form ammonium ions. For example, inorganic salts, such as, chloride ($NH_4Cl$), nitrate ($NH_4NO_3$), sulfate (($NH_4)_2SO_4$) and the like, as well as organic salts, such as, formate ($NH_4OCOH$), acetate ($NH_4OCOCH_3$), alkylate ($NH_4C_3H_{n+1}$) and the like can be used. Among these, from the viewpoint of safety, economy and the like, ammonium chloride is preferred. The concentration of the ammonium salt aqueous solution is not especially limited. However, if the concentration is low, a large amount of solution becomes necessary. A suitable concentration is about 0.1 to 5 mol/l. The amount of the ammonium salt aqueous solution relative to the porous clay intercalation compound should be sufficient to provide the ammonium ions necessary to completely ion-exchange the remaining cations. Usually, a 2 to 10 fold excess allows the ion-exchange to proceed easily and completely. The ion-exchange may be facilitated by mechanically mixing with an agitator or a homogenizer, or by heating. The porous clay intercalation compound, after being treated with the ammonium salt aqueous solution, is washed with water if necessary, and dried.

Re-heat Treatment Step

In the next re-heat treatment step, the porous clay intercalation compound, after the above-mentioned ammonium treatment step, is heated to 200° to 900° C. by means of an electric furnace or the like. Owing to this heat treatment, the ammonium ions dissociate into ammonia and hydrogen ions, and the ammonia dissipates and desorbs from the porous clay intercalation compound. However, hydrogen ions remain, so that a porous clay intercalation compound carrying the hydrogen ions (6) is formed as shown in FIG. 1E. If the heating temperature is less than 200° C., the dissociation of the ammonium ions is insufficient, while if it exceeds 900° C., the clay silicate layer decomposes, which is undesirable. The most preferable temperature is 300° to 500° C., however, this depends on the type of clay and pillars.

Thus, the present invention provides a simple process in which a part of the cations of the laminar clay is exchanged with the precursor ions of the inorganic pillars followed by heat treatment, and the remaining cations are exchanged with ammonium ions followed by re-heat treatment, allowing hydrogen ions to be present in the pore portions as well as the surface portion of the porous clay intercalation compound.

This process results in a novel porous clay intercalation compound having high catalytic activity owing to the hydrogen ions in addition to shape selectivity properties because of the uniform pore structure.

The present invention is described in greater detail with reference to the following examples, although it is not limited thereto.

EXAMPLE 1

While vigorously agitating 750 ml of 0.2 M aluminum chloride ($AlCl_3.6H_2O$) aqueous solution with a stirrer, 3750 ml of 0.1 M sodium hydroxide (NaOH) aqueous solution were added dropwise thereto at a rate of about 50 ml/h, followed by refluxing at 95° C. for 48 hours, to provide an Al polynuclear cation aqueous solution.

30.0 g of a dry powder of sodium montmorillonite (Kunimine Co., Ltd., Kunipia F) were added thereto and agitated for 3 hours at room temperature, and most of the Na ions between the montmorillonite layers were ion-exchanged with the Al polynuclear cations. The solid portion was separated by centrifugation, and the separated solid portion was washed with distilled water until no chlorine ion was observed in the washing. The wash solid portion was dried at 80° C.

The dried material was heat-treated in an electric muffle furnace in atmospheric air at 400° C. for 2 hours to obtain an $Al_2O_3$ montmorillonite porous compound. This sample is designated as M1.

10.0 g of the above-mentioned M1 were mixed with 200 ml of 0.5 M ammonium chloride ($NH_4Cl$), which was agitated for 20 hours to exchange the remaining $Na^+$ ions in the porous compound with $NH_4^+$ ions, followed by washing with water and drying at 80° C. The dried material was heat-treated in an electric muffle furnace in atmospheric air at 400° C. for 2 hours to desorb ammonia and produce a montmorillonite porous compound carrying hydrogen ions. This sample was designated as M1-H.

EXAMPLE 2

An $Al_2O_3$ montmorillonite porous compound was obtained in the same manner as Example 1 except that the ion-exchange time for the Na ions between the montmorillonite layers and the Al polynuclear cations was 10 minutes. This sample, designated M2, was subjected to the ammonium chloride and heat treatments, in the same manner as Example 1, to obtain a montmorillonite porous compound carrying hydrogen ions. This sample was designated M2-H.

EXAMPLE 3

10% sol of sodium fluoride tetrasilicic mica ($NaMg_{2.5}Si_4O_{10}F_2$, produced by Topy Industries Co., Ltd.) as an example of one species of artificial mica was dried at 100° C., and then the dried material was pulverized into a dry power having a particle size not more than 88 μm.

15.0 g of the above-mentioned artificial mica powder were added to 3 l of the Al polynuclear cation aqueous solution prepared in Example 1, and the mixture was agitated at room temperature for 1 day to ion-exchange the Na ions between the artificial mica layers with the Al polynuclear cations. Next, centrifugation, washing with water, drying and heat treatment at 400° C. were performed in the same manner as Example 1 to obtain an $Al_2O_3$-artificial mica porous compound. This sample is designated as T3.

Thereafter the same treatments were performed in the same manner as Example 1 to obtain an artificial mica porous compound carrying hydrogen ions. This sample is designated as T3-H.

EXAMPLE 4

An $Al_2O_3$-artificial mica porous compound was obtained in the same manner as Example 3 except that the ion-exchange time with the Al polynuclear cations was 30 minutes. This sample, designated T4, was subjected to the ammonium chloride treatment and the heating treatment in the same manner as Example 1 to obtain an artificial mica porous compound carrying hydrogen ions. This sample is designated as T4-H.

EXAMPLE 5

1 l of 0.4 M zirconium oxychloride ($ZrOCl_2.8H_2O$) solution refluxed in a boiling state for 1 hour, was admixed with 30.0 g of the sodium fluoride tetrasilicic mica powder used in Example 3. The refluxing was continued for 16 hours in a boiling state while agitating with a stirrer to ion-exchange the Na ions between the artificial mica layers with the Zr polynuclear cations. The solid portion was separated by centrifugation, and this solid portion was washed with distilled water until chlorine ion was no longer observed in the washings. After further drying at 80° C., the dried material was heat-treated for 2 hours at 500° C. in an electric muffle furnace to obtain a $ZrO_2$-artificial mica porous compound. This sample, designated T5, was subjected to an ammonium chloride and heating treatments in the same manner as Example 1 to obtain an artificial mica porous compound carrying hydrogen ions. This sample was designated as T5-H.

EXAMPLE 6

A $ZrO_2$-artificial mica porous compound was obtained in the same manner as Example 5 except that the ion-exchange time with the Zr polynuclear cations was 10 minutes. This sample, designated T6, was subjected to an ammonium chloride and heating treatments in the same manner as Example 1 to obtain an artificial mica porous compound carrying hydrogen ions. This sample was designated as T6-H.

Test Method and Result

The interlayer spacing (i.e., the respective distance between layers), specific surface area, remaining amounts of Na, and solid acid amount were measured for each of the porous clay intercalation compounds obtained in Examples 1 to 6. T-butylation reaction tests of naphthalene were carried out using these porous clay intercalation compounds as catalysts, to compare catalytic activities by measuring the conversion ratio of naphthalene. The results are shown in Table 1, in which, with respect to the type of the clay, MT indicates montmorillonite, and TSM indicates sodium fluoride tetrasilicic mica, respectively.

The interlayer spacing in Table 1 was determined by subtracting the thickness of the silicate layer of 9.6 angstroms from a bottom plane interval value, (i.e., a basal spacing) ($d_{001}$) measured by X-ray diffraction. The specific surface area was measured by the nitrogen adsorption method (BET method). The Na remaining amount was quantitatively measured by atomic absorption after dissolving the porous clay intercalation compound by means of a hydrofluoric acid-perchloric acid treatment. The amount of solid acid was quantitatively measured by the n-butylamine titration method using dicinnamylacetone (pKa=−3.0) as an indicator.

In addition, the t-butylation reaction test of naphthalene was performed using a fixed bed flow reaction apparatus. For this procedure, 0.50 g of a porous clay intercalation compound sample as a catalyst was charged into a quartz reaction tube, and the pre-treatment was performed at 200° C. for 3 hours, while He carrier gas was passed through the tube at a rate of 25 ml/minute. Next, the reaction temperature was changed to 150° C., and the steam of a reaction solution (naphthalene: t-butanol:mesitylene=1:10:5) was passed through the catalyst for 1 hour. After flowing through the catalyst, the product gas was recovered by a liquid nitrogen trap. The amount of naphthalene in the reaction solution and the recovered solution were analyzed by gas chromatography, and the conversion ratio of the naphthalene was determined. The contact time during the reaction was from 4.2 to 6.7 seconds.

TABLE 1

| Sample Symbol | Type of Clay | Type of Pillar | Presence or Absence of Carrying Hydrogen Ions | Interlayer Spacing (Angstrom) |
|---|---|---|---|---|
| Example 1 | M1 | MT | #1 | absent | 8.5 |
| | M1-H | MT | #1 | present | 8.4 |
| Example 2 | M2 | MT | #1 | absent | 8.2 |
| | M2-H | MT | #1 | present | 8.0 |
| Example 3 | T3 | TSM | #1 | absent | 8.7 |
| | T3-H | TSM | #1 | present | 8.5 |
| Example 4 | T4 | TSM | #1 | absent | 8.5 |
| | T4-H | TSM | #1 | present | 8.4 |
| Example 5 | T5 | TSM | #2 | absent | 12.3 |
| | T5-H | TSM | #2 | present | 12.0 |
| Example 6 | T6 | TSM | #2 | absent | 12.0 |
| | T6-H | TSM | #2 | present | 11.8 |

| Sample Symbol | Type of Clay | Type of Pillar | Specific Surface Area ($m^2/g$) | Na Remaining Amount (mol/unit composition) |
|---|---|---|---|---|
| Example 1 | M1 | MT | #1 | 250 | 0.02 |
| | M1-H | MT | #1 | 228 | 0.00 |
| Example 2 | M2 | MT | #1 | 215 | 0.16 |
| | M2-H | MT | #1 | 194 | 0.00 |
| Example 3 | T3 | TSM | #1 | 323 | 0.25 |
| | T3-H | TSM | #1 | 301 | 0.05 |
| Example 4 | T4 | TSM | #1 | 285 | 0.42 |
| | T4-H | TSM | #1 | 251 | 0.05 |
| Example 5 | T5 | TSM | #2 | 204 | 0.22 |
| | T5-H | TSM | #2 | 223 | 0.03 |
| Example 6 | T6 | TSM | #2 | 216 | 0.38 |
| | T6-H | TSM | #2 | 231 | 0.03 |

| Sample Symbol | Type of Clay | Type of Pillar | Solid Acid Amount (m mol/g) | Naphthalene Conversion Ratio (%) |
|---|---|---|---|---|
| Example 1 | M1 | MT | #1 | 1.09 | 25 |
| | M1-H | MT | #1 | 1.27 | 46 |
| Example 2 | M2 | MT | #1 | 0.53 | 10 |
| | M2-H | MT | #1 | 1.43 | 53 |
| Example 3 | T3 | TSM | #1 | 0.19 | 29 |
| | T3-H | TSM | #1 | 0.33 | 53 |
| Example 4 | T4 | TSM | #1 | 0.10 | 13 |
| | T4-H | TSM | #1 | 0.41 | 63 |
| Example 5 | T5 | TSM | #2 | 0.28 | 37 |
| | T5-H | TSM | #2 | 0.45 | 56 |
| Example 6 | T6 | TSM | #2 | 0.15 | 20 |
| | T6-H | TSM | #2 | 0.52 | 61 |

Note: #1 stands for $Al_2O_3$ and #2 stands for $ZrO_2$.

As shown in Table 1, the inventive porous clay intercalation compound had a reduced residual amount of Na, an increased amount of solid acid, an increased naphthalene conversion ratio, and exhibited improved catalytic activity.

What is claimed is:

1. A porous clay intercalation compound comprising a series of layers of a laminar clay, inorganic pillars between said layers forming pore and surface portions, and hydrogen ions adhered in said pore and on said surface portions of said pillars.

2. The compound of claim 1 wherein the clay is a phyllosilicate having ion-exchange properties.

3. The compound of claim 1 wherein the laminar clay is selected from the group consisting of montmorillonite, beidellite, hectorite, saponite, nontronite, vermiculite and artificial fluoromica, and mixtures thereof.

4. The compound of claim 2 wherein the laminar clay is selected from the group consisting of montmorillonite, beidellite, hectorite, saponite, nontronite, vermiculite and artificial fluoromica, and mixtures thereof.

5. The compound of claim 1 wherein the inorganic pillar is an inorganic oxide selected from the group consisting of $Al_2O_3$, $ZrO_2$, $Cr_2O_3$, $Bi_2O_3$, $SiO_2$, $TiO_2$, $Fe_2O_3$, and mixtures thereof.

6. The compound of claim 2 wherein the inorganic pillar is an inorganic oxide selected from the group consisting of $Al_2O_3$, $ZrO_2$, $Cr_2O_3$, $Bi_2O_3$, $SiO_2$, $TiO_2$, $Fe_2O_3$, and mixtures thereof.

7. A method for making porous clay intercalation compound comprising:
 a) mixing a laminar clay having layers with cations therebetween with a solution containing inorganic pillar precursor ions to exchange a part of the cations with said precursor ions;
 b) heat-treating the ion-exchanged laminar clay from step a) at 100° to 900° C. to generate a porous clay intercalation compound comprising a series of layers of a laminar clay, inorganic pillars between said layer forming pore and surface portions;
 c) mixing the porous clay intercalation compound with an ammonium salt aqueous solution to exchange any remaining cations with ammonium ions; and
 d) heating the porous clay intercalation compound from step c) at 200° to 900° C. to desorb ammonia, and absorb hydrogen ions in pore and surface portions of the pillar of said porous clay intercalation compound.

8. The method of claim 7 wherein the clay is a phyllosilicate having ion-exchange properties.

9. The method of claim 7 wherein the precursor ions are precursor ions of pillars selected from the group consisting of $Al_2O_3$, $ZrO_2$, $Cr_2O_3$, $Bi_2O_3$, $SiO_2$, $TiO_2$, $Fe_2O_3$, and mixtures thereof.

10. The method of claim 7 wherein the laminar clay is selected from the group consisting of montmorillonite, beidellite, hectorite, saponite, nontronite, vermiculite and artificial fluoromica, and mixtures thereof.

11. The method of claim 7 wherein the precursor ions of the inorganic pillars are polynuclear metal hydroxo cations.

12. The method of claim 7 wherein the precursor ions are positively charged hydroxide or oxide fine particles.

13. The method of claim 7 wherein the ammonium salt is selected from the group consisting of $NH_4Cl$, $NH_4NO_3$, $(NH_4)_2SO_4$, $NH_4OCOH$, $NH_4OCOCH_3$, $NH_4C_nH_{n+1}$, wherein n is an integer, and mixtures thereof.

14. The method of claim 13 wherein the concentration of the ammonium salt solution is from 0.1 to 5 mol/l.

15. The method of claim 14 wherein ammonium ions are present in a 2 to 10 fold excess relative to the porous clay intercalation compound.

16. The method of claim 7 wherein the temperature in step b) is from 300° to 500° C.

17. The method of claim 7 wherein the temperature in step d) is from 300° to 500° C.

18. A porous clay intercalation compound made by the method of claim 7.

* * * * *